(12) United States Patent
Davezac et al.

(10) Patent No.: US 8,927,651 B2
(45) Date of Patent: Jan. 6, 2015

(54) HIGH-VISCOSITY POLYAMIDE COMPOSITION

(75) Inventors: Magali Davezac, Lyons (FR); Wojciech Bzducha, Lyons (FR)

(73) Assignee: Rhodia Operations, Aubervilliers (FR)

( * ) Notice: Subject to any disclaimer, the term of this patent is extended or adjusted under 35 U.S.C. 154(b) by 219 days.

(21) Appl. No.: 13/639,073

(22) PCT Filed: Apr. 4, 2011

(86) PCT No.: PCT/EP2011/055199
§ 371 (c)(1),
(2), (4) Date: Dec. 17, 2012

(87) PCT Pub. No.: WO2011/124547
PCT Pub. Date: Oct. 13, 2011

(65) Prior Publication Data
US 2013/0131269 A1 May 23, 2013

(30) Foreign Application Priority Data
Apr. 6, 2010 (FR) .................................... 10 52558

(51) Int. Cl.
| *C08L 77/10* | (2006.01) |
| *C08L 77/06* | (2006.01) |
| *C08L 77/00* | (2006.01) |
| *C08L 77/02* | (2006.01) |
| *C08L 63/00* | (2006.01) |
| *C08L 35/06* | (2006.01) |
| *C08L 51/06* | (2006.01) |

(52) U.S. Cl.
CPC ................. *C08L 77/00* (2013.01); *C08L 77/06* (2013.01); *C08L 63/00* (2013.01); *C08L 35/06* (2013.01); *C08L 77/02* (2013.01); *C08L 51/06* (2013.01)
USPC ............ 525/66; 525/92 B; 525/178; 525/179; 525/181; 525/183; 525/184; 525/420; 525/421; 525/423; 525/424; 525/433; 525/434

(58) Field of Classification Search
None
See application file for complete search history.

(56) References Cited

U.S. PATENT DOCUMENTS

| 2,682,526 | A | | 6/1954 | Flory | |
|---|---|---|---|---|---|
| 4,536,563 | A | * | 8/1985 | Okitsu et al. .................. | 528/279 |
| 4,839,441 | A | * | 6/1989 | Cuzin et al. ................... | 528/328 |
| 5,162,484 | A | * | 11/1992 | Judas ............................ | 528/183 |
| 6,867,256 | B1 | | 3/2005 | De Silvestro et al. | |
| 6,872,800 | B1 | * | 3/2005 | Bouquerel et al. ............ | 528/310 |
| 2004/0054054 | A1 | * | 3/2004 | Blondel et al. ................ | 524/416 |
| 2004/0054122 | A1 | | 3/2004 | Di Silvestro et al. | |
| 2005/0004312 | A1 | | 1/2005 | Crevecoeur et al. | |
| 2005/0222376 | A1 | | 10/2005 | Sassi et al. | |
| 2006/0107466 | A1 | * | 5/2006 | Sassi et al. ................... | 8/115.51 |
| 2007/0060719 | A1 | | 3/2007 | Clement et al. | |

FOREIGN PATENT DOCUMENTS

| WO | 95/20011 A1 | 7/1995 |
|---|---|---|
| WO | 99/03909 A1 | 1/1999 |
| WO | 2009/005260 A1 | 1/2009 |

OTHER PUBLICATIONS

International Search issued on May 25, 2011, by the European Patent Office as the International Searching Authority in International Patent Application No. PCT/EP2011/055199.

* cited by examiner

*Primary Examiner* — Robert Sellers
(74) *Attorney, Agent, or Firm* — Dentons US LLP

(57) ABSTRACT

A high-viscosity polyamide composition including a branched polyamide is described. Also described, is a relationship between a high-viscosity polyamide composition and a composition including a copolyamide of a statistical tree type resulting from a reaction between a multifunctional monomer including at least three reactive functions in order to form an amide function. Further described, are three reactive functions of two different types and bifunctional monomers used in the manufacture of linear polyamides. A resulting copolyamide can have a very low melt flow index relative to the linear polyamide and improved impact resistance properties. Lastly, use of such a composition for extrusion blow-molding articles is described.

14 Claims, No Drawings

HIGH-VISCOSITY POLYAMIDE COMPOSITION

CROSS-REFERENCE TO PRIOR APPLICATIONS

This application is a National Stage of PCT/EP2011/055199, filed Apr. 4, 2011, and designating the United States (published in French on Oct. 13, 2011, as WO 2011/124547 A1; the title and abstract were published in English), which claims priority to FR 10/52558, filed Apr. 6, 2010, each hereby expressly incorporated by reference in its entirety and each assigned to the assignee hereof.

The present invention relates to a high-viscosity polyamide composition comprising a branched polyamide. It relates more particularly to a composition comprising a copolyamide of the random tree type resulting from the reaction between a polyfunctional monomer comprising at least three functional groups which react to form an amide functional group, these functional groups being of two different types, and bifunctional monomers conventionally used in the manufacture of linear polyamides. The copolyamide obtained exhibits a very low melt flow index with respect to the linear polyamide and improved impact strength properties. The invention also relates to the use of this composition for the extrusion blow-molding of articles.

In the field of parts made of plastic, numerous parts are obtained by molding a composition comprising a polyamide as matrix. The polyamides generally used are linear aliphatic, aromatic or semi-aromatic polyamides.

The new processes for shaping these compositions, such as for example, extrusion blow-molding, require compositions exhibiting a high melt viscosity in order for the part extruded before the blow molding not to be or only to be slightly distorted under the effect of its own weight. However, the mechanical, elastic and impact strength properties of the parts must not be affected or only slightly affected. Some solutions have been provided, such as the use of linear polyamides of high viscosity obtained by post-condensation in a solid medium, or by addition of chain-extending agents. However, these solutions are often difficult to implement or detrimentally affect certain properties of the parts obtained.

An aim of the invention is a novel polyamide exhibiting a high melt viscosity which can be obtained by a simple and controllable manufacturing process and with satisfactory mechanical characteristics, without damaging the various operational properties of the articles manufactured, such as, in particular, the permeability.

To this end, the present invention provides a composition capable of being obtained by blending at least:
a) one copolyamide having a structure of the random tree type, which is the result of the reaction between at least:
one polyfunctional monomer corresponding to the following general formula I:

$(AR_1)—R—(R_2B)_n$ (I)

in which: n is an integer between 2 and 10 (limits included), $R_1$ and $R_2$ can be identical or different and represent a covalent bond or an aliphatic, arylaliphatic, aromatic or alkylaromatic hydrocarbon radical, R is a linear or branched aliphatic radical, a substituted or unsubstituted cycloaliphatic radical, a substituted or unsubstituted aromatic radical which can comprise several aromatic rings and/or heteroketones, A represents the amine or amine salt functional group or the acid, ester, acid halide or amide functional group, and B represents the amine or amine salt functional group, when A represents an acid, ester, acid halide or amide functional group, and an acid, ester, acid halide or amide functional group, when A represents an amine or amine salt functional group,
at least one of the bifunctional monomers of following formulae II to IV:

$A_1-R_3-A_1$ (II)

$B_1-R_4-B_1$ (III) and/or

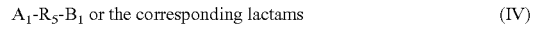

$A_1-R_5-B_1$ or the corresponding lactams (IV)

with optionally at least one of the monofunctional monomers of following formula V or following formula VI:

$R_6-B_1$ (V), and/or

$R_7-A_1$ (VI)

in which: $A_1$ and $B_1$ respectively represent an acid, ester or acid chloride functional group and an amine or amine salt functional group and $R_3$, $R_4$, $R_5$, $R_6$ and $R_7$ represent linear or branched alkyl hydrocarbon radicals, substituted or unsubstituted aromatic hydrocarbon radicals or alkylaryl, arylalkyl or cycloaliphatic hydrocarbon radicals which can comprise unsaturations; and
b) one chain extender.

Such a copolyamide with a structure of the random tree type is described in particular in Application WO99/03909.

According to a preferred characteristic of the invention, the R radical is an aromatic radical, $R_1$ and $R_2$ each representing a covalent bond. Furthermore, the B and A functional groups of the formula (I) are respectively an acid functional group and an amine functional group, the number n of acid functional groups advantageously being equal to 2.

Thus, the suitable and preferred polyfunctional monomers of the invention are in particular the monomers which are stable thermally at a temperature of greater than 150° C. Mention may be made, by way of example, of the polyfunctional monomers in accordance with the formula (I) in which R represents an aromatic radical, such as aminophthalic acid, or a linear aliphatic radical, such as 3-aminopimelic acid or 6-aminoundecanedioic acid. Mention may also be made of α-amino acids, such as aspartic acid or glutamic acid. Natural amino acids can also be used as polyfunctional monomer, if their thermal stability is satisfactory.

The difunctional monomers of formulae (II) to (IV) are the monomers used for the manufacture of linear thermoplastic polyamides. Thus, mention may be made of ω-aminoalkanoic compounds comprising a hydrocarbon chain having from 4 to 12 carbon atoms, or the lactams derived from these amino acids, such as ε-caprolactam, saturated aliphatic dicarboxylic acids having from 6 to 12 carbon atoms, such as, for example, adipic acid, azelaic acid, sebacic acid or dodecanoic acid, or biprimary diamines, which are preferably saturated, linear or branched and aliphatic, having from 6 to 12 carbon atoms, such as, for example, hexamethylenediamine trimethylhexamethylenediamine, tetramethylenediamine or m-xylenediamine.

Of course, mixtures of these monomers can be used.

The preferred bifunctional monomers of the invention are ε-caprolactam, or hexamethylenediamine and adipic acid, or a mixture of these.

The molar ratio of the polyfunctional monomers of formula (I) to the sum of the bifunctional monomers of formulae (II) to (IV) and monofunctional monomers of formulae (V) and (VI) is preferably between 0.01% and 5%, preferably between 0.05% and 1%, in order to obtain a copolyamide exhibiting a level of mechanical properties equivalent to that of the corresponding linear polyamide.

The copolyamide preferably exhibits a melt flow index (M.F.I.) of less than 5 g/10 min (measured at 275° C. under a load of 2160 g) and advantageously a distribution index D for the molecular weights of greater than 2. The distribution index D for the molecular weights is a function of the degree of polymerization DPn and of the functionality factor F of the polymer.

The polymerization is carried out in particular according to the conventional operating conditions for the polymerization of dicarboxylic acids and diamines, when the polymerization is carried out in the absence of the polyfunctional compounds.

Such a polymerization process can comprise, in brief:
heating the mixture of monomers and polyfunctional compounds with stirring and under pressure,
maintaining the mixture under pressure and temperature for a predetermined period of time, with removal of water vapor by an appropriate device, and then decompression and maintaining for a predetermined period of time at a temperature greater than the melting point of the mixture, in particular under autogenous pressure of water vapour, under nitrogen or under vacuum, in order thus to continue the polymerization by removal of the water formed.

It is perfectly possible to carry out the polymerization until the thermodynamic equilibrium of the polyamide is obtained.

The polyfunctional and optionally monofunctional compounds are preferably added at the start of the polymerization. In this case, a mixture of the dicarboxylic acid and diamine monomers and of the polyfunctional and monofunctional compounds is polymerized.

It is perfectly possible to add normal additives, at the start, during or at the end of the polymerization, such as, for example, catalysts, such as in particular phosphorus-based catalysts, anti-foaming agents and heat or light stabilizers.

On exiting from the polymerization, the polymer can be cooled, advantageously with water, and extruded, and then cut up to produce granules.

The polymerization process according to the invention can perfectly well be carried out continuously or batchwise.

The chain extenders for the polyamide are normally capable of reacting with the amine or acid terminal groups of the polyamide. The chain extenders exhibit at least two functional groups capable of reacting with the terminal groups of the polyamide, so as to connect two polyamide chains and thus to increase the viscosity of the modified polyamide. The use of bis-lactams is in particular mentioned in U.S. Pat. No. 2,682,526.

Mention may in particular be made, as chain extenders according to the invention, of compounds chosen from the group consisting of: dialcohols, such as ethylene glycol, propanediol, butanediol, hexanediol or hydroquinone bis(hydroxyethyl)ether, bis-epoxides, such as bisphenol A diglycidyl ether, polymers carrying epoxide functional groups, polymers carrying anhydride functional groups, bis-N-acyl bis-caprolactams, such as isophthaloyl bis-caprolactam (IBC), adipoyl bis-caprolactam (ABC) or terephthaloyl bis-caprolactam (TBC), diphenyl carbonates, bisoxazolines, oxazolinones, diisocyanates, organic phosphites, such as triphenyl phosphite or caprolactam phosphite, bis-ketenimines or dianhydrides.

The composition preferentially comprises from 0.01% to 5% by weight of chain extenders for the polyamide, with respect to the total weight of the composition. More preferentially, the composition comprises from 0.1% to 3% by weight of chain extenders for the polyamide, with respect to the total weight of the composition. Use may in particular be made of from 0.01% to 10% by weight of chain extenders for the polyamide, with respect to the weight of the polyamide.

The preferred chain extenders are insensitive to the moisture content of the polyamide under the conditions of the polyamidation reaction and do not generate secondary products.

In order to improve the mechanical properties of this composition, it can be advantageous to add thereto at least one reinforcing and/or bulking filler preferably chosen from the group consisting of fibrous fillers, such as glass fibers, inorganic fillers, such as clays, kaolin or reinforcing or thermosetting nanoparticles, and powdered fillers, such as talc. The degree of incorporation of reinforcing and/or bulking filler is in accordance with the standards in the field of composite materials. It can, for example, be a content of filler of 1% to 80%, preferably of 10% to 70% and in particular between 30% and 60%.

The composition can comprise, in addition to the modified polyamide of the invention, one or more other polymers, preferably polyamides or copolyamides.

The composition according to the invention can additionally comprise additives normally used in the manufacture of polyamide compositions intended to be molded. Thus, mention may be made of lubricants, flame retardants, plasticizers, nucleating agents, catalysts, agents for improving the toughness, such as optionally grafted elastomers, light and/or heat stabilizers, antioxidants, antistatics, colorants, mattifying agents, molding aids or other conventional additives.

These fillers and additives can be added to the modified polyamide via normal means suited to each filler or additive, such as, for example, during the polymerization or in the cold or molten mixture.

The composition according to the invention comprising the polyamide as defined above can also comprise at least one impact modifier, that is to say a compound capable of modifying the impact strength of a polyamide composition. These impact modifiers preferentially comprise functional groups which react with the polyamide.

According to the invention, the term "functional groups which react with the polyamide" is understood to mean groups capable of reacting or of interacting chemically with the acid or amine functional groups of the polyamide, in particular by covalency, ionic or hydrogen bond interaction or van der Waals bonding. Such reactive groups make it possible to ensure good dispersing of the impact modifiers in the polyamide matrix. Good dispersing is generally obtained with impact modifier particles which have a mean size of between 0.1 and 1 μm in the matrix.

Use is preferably made of impact modifiers comprising functional groups which react with the polyamide as a function of the acid or amine nature of the ΔGT of the polyamide. Thus, for example, if the ΔGT is acid, use will preferably be made of reactive functional groups capable of reacting or of interacting chemically with the acid functional groups of the polyamide, in particular by covalency, ionic or hydrogen bond interaction or van der Waals bonding. Thus, for example, if the ΔGT is amine, use will preferably be made of reactive functional groups capable of reacting or of interacting chemically with the amine functional groups of the polyamide, in particular by covalency, ionic or hydrogen bond interaction or van der Waals bonding.

Use is preferably made of impact modifiers having functional groups which react with the polyamide exhibiting a ΔGT of amine nature.

The impact modifiers can very well comprise in themselves functional groups which react with the polyamide, for example as regards ethylene/acrylic acid (EAA).

It is also possible to add thereto functional groups which react with the polyamide, generally by grafting or copolymerization, for example for ethylene/propylene/diene (EPDM) grafted with maleic anhydride.

Use may be made, according to the invention, of impact modifiers which are oligomeric or polymeric compounds comprising at least one of the following monomers or their mixture: ethylene, propylene, butene, isoprene, diene, acrylate, butadiene, styrene, octene, acrylonitrile, acrylic acid, methacrylic acid, vinyl acetate, vinyl esters, such as acrylic and methacrylic esters and glycidyl methacrylate. These compounds according to the invention can also comprise, in addition, other monomers than those mentioned above.

The base of the impact modifier, optionally known as elastomer base, can be chosen from the group consisting of: polyethylenes, polypropylenes, polybutenes, polyisoprenes, ethylene/propylene rubbers (EPR), ethylene/propylene/diene rubbers (EPDM), ethylene and butene rubbers, ethylene and acrylate rubbers, butadiene and styrene rubbers, butadiene and acrylate rubbers, ethylene and octene rubbers, butadiene and acrylonitrile rubbers, ethylene/acrylic acid products (EAA), ethylene/vinyl acetate products (EVA), ethylene/acrylic ester products (EAE), acrylonitrile/butadiene/styrene copolymers (ABS), styrene/ethylene/butadiene/styrene block copolymers (SEBS), styrene/butadiene/styrene copolymers (SBS), core/shell elastomers of methacrylate/butadiene/styrene type (MBS), or blends of at least two elastomers listed above.

In addition to the groups listed above, these impact modifiers can also comprise, generally grafted or copolymerized, functional groups which react with the polyamide, such as, in particular, the following functional groups: acids, such as carboxylic acids, salified acids, esters in particular, acrylates and methacrylates, ionomers, glycidyl groups, in particular epoxy groups, glycidyl esters, anhydrides, in particular maleic anhydrides, oxazolines, maleimides or their mixtures.

Such functional groups on the elastomers are, for example, obtained by use of a comonomer during the preparation of the elastomer.

Mention may in particular be made, as impact modifiers comprising functional groups which react with the polyamide, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and their hydrogenated versions.

The proportion by weight of the impact modifiers in the total composition is in particular between 0.1% and 50%, preferably between 0.1% and 20% and in particular between 0.1% and 10%, with respect to the total weight of the composition.

The composition according to the present invention very preferably comprises a copolyamide with a structure of the random tree type, a chain extender and an impact modifier.

According to a characteristic of the invention, the compositions of the invention are obtained by blending, generally in a single- or twin-screw extruder, a polyamide in accordance with the invention with the various additives, this blending being carried out generally in the molten state of the polyamide, followed by extrusion of the blend in the form of rods, which are subsequently cut up into granules. The molded parts are subsequently produced by melting the granules produced above and feeding the molten composition into the appropriate molding, injection molding or extrusion devices.

The composition according to the invention can be used in numerous applications, such as the manufacture of molded or injection molded or blow-molded parts. The composition is particularly suitable for the manufacture of parts by the continuous or batchwise extrusion blow-molding techniques, with or without a storage head.

This is because the low melt fluidity of the composition makes it possible to limit the distortions of the parisons during their extrusion, before the blow-molding stage. The present invention also relates to a process for blow-molding by extrusion which employs a polyamide composition according to the invention.

The composition according to the invention can also be used as matrix in a composition comprising a high proportion of additives of masterbatch type intended to be blended with another thermoplastic composition. The compositions of the invention can also comprise, as polymeric matrix, in addition to the polyamide as described above, other thermoplastics, such as linear aliphatic polyamides or aromatic or semi-aromatic polyamides, for example.

Specific terms are used in the description so as to facilitate understanding of the principle of the invention. Nevertheless, it should be understood that no limitation on the scope of the invention is envisaged by the use of these specific terms. The term "and/or" includes the meanings "and", "or" and all the other possible combinations of the elements connected to this term.

Other details or advantages of the invention will become more clearly apparent in the light of the examples below, given solely by way of indication.

EXPERIMENTAL PART

The compounds used are as follows:
Polyamide a) of random tree type obtained according to Application WO99/03909 using 0.185 mol % of 5-aminoisophthalic acid and 99.8% of ε-caprolactam. The polyamide exhibits a melt flow index (MFI) of from 5 to 10 g/10 min (according to the standard ASTM D1238 under a load of 2160 g and at a temperature of 275° C.); and a viscosity index of 200 to 225 ml/g (determined in formic acid according to the method PN-EN ISO 307).
Linear polyamide 66, having a VI of 175 ml/g (determined in 90% formic acid according to the standard ISO 307).
Chain extender: Araldite GT7071, SMA Xiran XZ-09-002 (Polyscope) (copolymer of styrene with maleic anhydride).
Impact modifier: Exxelor VA1801 (ethylenic copolymer grafted with maleic anhydride).

Polyamide formulations are manufactured by melt blending polyamide a), in a twin-screw extruder of Werner and Pfleiderer ZSK 40 type with venting (L/D=36), with various proportions by weight of chain extender, 25% by weight of impact modifiers and 2% by weight of stabilizer. The extrusion parameters are as follows: extrusion temperature with an increasing profile 250-270° C.; rotational speed of the screw: 250 revolutions per minute; throughput of the composition 40 kg/h; the motor torque and the motor power absorbed vary according to the polyamides.

TABLE 1

| Formulations | C1 | 2 | 3 | 4 | 5 | C2 | C3 | C4 |
|---|---|---|---|---|---|---|---|---|
| PA6, tree | 75 | 74.5 | 74 | 74.5 | 74 | | | |
| PA66, linear | | | | | | 75 | 74.5 | 74 |
| Elastomer VA1801 % | 25 | 25 | 25 | 25 | 25 | 25 | 25 | 25 |
| Araldite % | | 0.5 | 1 | | | | 1 | |
| SMA % | | | | 0.5 | 1 | | | 1 |

Different mechanical properties were measured on these formulations and the results are mentioned in the following table.

TABLE 2

| Formulations | C1 | 2 | 3 | 4 | 5 | C2 | C3 | C4 |
|---|---|---|---|---|---|---|---|---|
| % by weight of chain extender | 0 | 0.5 | 1 | 0.5 | 1 | 0 | 1 | 1 |
| MFI in g/10 min (10 kg, 275° C.) | 1.23 | 0.32 | 0.37 | 0.32 | 0.35 | nm | nm | nm |
| Notched Charpy impact, 23° C. (kJ/m$^2$) | 118 | 122 | 120 | 124 | 119 | 108 | 105 | 94 |
| Notched Charpy impact, −40° C. (kJ/m$^2$) | 71 | 85 | 80 | 77 | 48 | 30 | 26 | 29 |
| Viscosity (Pa · s) at 10 s$^{-1}$ | 8855 | 10317 | 10560 | 11143 | 10710 | 4510 | 4630 | 4700 |
| Parison drop time (in s) | 39.1 | 43.9 | 46.8 | 47.2 | 46.9 | 37.2 | 42.2 | 44.5 | nm = not measured

The notched Charpy impact is measured according to the standard ISO 179-1/1eA.

The viscosity is measured using a Göttfert 2002 capillary rheometer. A piston, moving at programmed rates, pushes the molten polymer through a capillary of length L (30 mm) and diameter D (1 mm). The corresponding flow rate is measured, from which the apparent viscosity can be deduced. A shear gradient scan is performed from 5000 s$^{-1}$ to 10 s$^{-1}$.

The melt strength is measured in the following way: the formulated polymer is introduced into a single-screw blow-molding machine at a temperature profile of 250-275° C. and at a fixed screw speed of 40 revolutions per minute; and the time necessary to allow the parison of molten polymer to travel a distance of 75 cm is recorded using photocells. The measurement is repeated at least 5 times in order to verify the low standard deviation. Thus, the greater the traveling time, the more the polymer exhibits a morphological behavior advantageous to the manufacture of articles by extrusion blow-molding.

It is thus observed that the addition of a chain-extending agent in combination with the polyamide of the invention makes it possible to significantly enhance the quality of the extruded parison.

Furthermore, there is observed, in the context of the combination according to the invention, an increase of approximately 19% in the apparent viscosity at a shear gradient of 10 s$^{-1}$ (comparison of example 3 with C1). In contrast, the simple addition of a chain-extending agent to a linear polyamide 66, as conventionally carried out in the prior art, results in an increase of approximately 4% in this apparent viscosity (comparison C3 or C4 with C2). This high viscosity makes all the easier the manufacture of articles by extrusion blow-molding and the quality of the article obtained.

The invention claimed is:

1. A composition obtained by blending at least:
   a) one copolyamide having a random tree structure, which results from a reaction between at least:
      one polyfunctional monomer corresponding to a general formula I:

   $$(AR_1)\text{---}R\text{---}(R_2B)_n \tag{I}$$

in which: n is an integer between 2 and 10 (limits included), $R_1$ and $R_2$ can be identical or different and represent a covalent bond or an aliphatic, arylaliphatic, aromatic or alkylaromatic hydrocarbon radical, R is a linear or branched aliphatic radical, a substituted or unsubstituted cycloaliphatic radical, a substituted or unsubstituted aromatic radical which can comprise several aromatic rings and/or heteroketones, A represents an amine or amine salt functional group or an acid, ester, acid halide or amide functional group, and B represents another amine or amine salt functional group, when A represents an acid, ester, acid halide or amide functional group, and an acid, ester, acid halide or amide functional group, when A represents an amine or amine salt functional group,
   at least one bifunctional monomer of following formula II to IV:

   $$A_1\text{-}R_3\text{-}A_1 \tag{II}$$

   $$B_1\text{-}R_4\text{-}B_1 \tag{III}$$

and

   $$A_1\text{-}R_5\text{-}B_1 \text{ or the corresponding lactams} \tag{IV}$$

with optionally at least one monofunctional monomer of formula V or formula VI:

   $$R_6\text{-}B_1 \tag{V},$$

and

   $$R_7\text{-}A_1 \tag{VI}$$

in which: $A_1$ and $B_1$ respectively represent an acid, ester or acid chloride functional group and an amine or amine salt functional group and $R_3$, $R_4$, $R_5$, $R_6$ and $R_7$ represent linear or branched alkyl hydrocarbon radicals, substituted or unsubstituted aromatic hydrocarbon radicals or alkylaryl, arylalkyl or cycloaliphatic hydrocarbon radicals which can comprise unsaturations; and
   b) one chain extender.

2. The composition as described by claim 1, wherein R is an aromatic radical.

3. The composition as described by claim 1, wherein the monomer of formula (I) is a compound in which A represents the amine functional group, B represents the acid functional group, n is equal to 2, R represents an aromatic radical and $R_1$ and $R_2$ represent a covalent bond.

4. The composition as described by claim 1, wherein the monomer of formula (I) is 5-aminoisophthalic acid.

5. The composition as described by claim 1, wherein the monomer of formula (I) is 6-aminoundecanedioic acid.

6. The composition as described by claim 1, wherein the copolyamide exhibits a melt flow index of less than 5 g/10 min, measured at 275° C. under a load of 2160 g.

7. The composition as described by claim 1, wherein the copolyamide exhibits a distribution index D of the molecular weights of greater than 2.

8. The composition as described by claim 1, wherein the chain extender is selected from the group consisting of: a dialcohol, a bis-epoxide, a polymer carrying epoxide functional group, a polymer carrying anhydride functional group, a bis-N-acyl bis-caprolactam, a diphenyl carbonate, a bisoxazoline, an oxazolinone, a diisocyanate, an organic phosphite.

9. The composition as described by claim 1, wherein the composition comprises from 0.01% to 5% by weight of chain extenders for the polyamide, with respect to the total weight of the composition.

10. The composition as described by claim 1, wherein the composition comprises an impact modifier.

11. The composition as described by claim 8, wherein the dialcohol is selected from the group consisting of ethylene glycol, propanediol, butanediol, hexanediol and hydroquinone bis(hydroxyethyl) ether.

12. The composition as described by claim 8, wherein the bis-epoxide is bisphenol A diglycidyl ether.

13. The composition as described by claim 8, wherein the bis-N-acyl bis-caprolactams is selected from the group consisting of isophthaloyl bis-caprolactam, adipoyl bis-caprolactam and terephthaloy bis-caprolactam.

14. The composition as described by claim 8, wherein the organic phosphite is a triphenyl phosphite or a caprolactam phosphite.

* * * * *